US009327392B2

(12) United States Patent
Reyna et al.

(10) Patent No.: US 9,327,392 B2
(45) Date of Patent: May 3, 2016

(54) CAGE NUT TOOL

(71) Applicant: US2 Designs, LLC, Dyer, IN (US)

(72) Inventors: Glenn P. Reyna, Dyer, IN (US); Darren Eason, Hebron, IN (US)

(73) Assignee: US2 DESIGNS, LLC, Dyer, IN (US)

( * ) Notice: Subject to any disclaimer, the term of this patent is extended or adjusted under 35 U.S.C. 154(b) by 201 days.

(21) Appl. No.: 14/140,999

(22) Filed: Dec. 26, 2013

(65) Prior Publication Data

US 2014/0182111 A1 Jul. 3, 2014

Related U.S. Application Data

(60) Provisional application No. 61/747,074, filed on Dec. 28, 2012.

(51) Int. Cl.

*B25B 27/00* (2006.01)
*B23P 19/00* (2006.01)
*B23P 19/02* (2006.01)
*B25B 27/14* (2006.01)

(52) U.S. Cl.

CPC ........... *B25B 27/14* (2013.01); *Y10T 29/49822* (2015.01); *Y10T 29/49824* (2015.01); *Y10T 29/49872* (2015.01); *Y10T 29/53909* (2015.01)

(58) Field of Classification Search

CPC ........ B25B 27/14; B25B 27/28; B25B 31/00; B25B 33/00; B25B 15/001; B25B 15/004; B25B 15/007; Y10T 29/53657; Y10T 29/49815; Y10T 29/49822; Y10T 29/824

USPC ........... 81/10, 57.12, 57.28, 57.38, 57.45, 68, 81/15.9, 44

See application file for complete search history.

(56) References Cited

U.S. PATENT DOCUMENTS 532,557 A * 1/1895 Hoffman ............. B25B 27/0028 294/26
1,611,408 A * 12/1926 Bowers ................... F16B 39/32 411/198
D197,205 S * 12/1963 Estwing ........................... D8/89
3,680,834 A * 8/1972 Holloway ................. B25F 1/00 254/25
3,698,689 A * 10/1972 Poskin .................... B25C 11/00 254/28
4,049,236 A * 9/1977 Grill ....................... B25C 11/00 254/28
D256,442 S * 8/1980 Martin ............................ 254/25
4,936,172 A * 6/1990 Jackson .............. F16B 23/0015 411/407
5,031,881 A * 7/1991 Thurmston ............. B25C 11/00 254/131
5,075,945 A * 12/1991 Krzecki .............. B25B 27/0028 29/235
5,079,791 A * 1/1992 Grech ..................... B25B 31/00 29/267
5,212,860 A * 5/1993 Lakey ....................... B25B 9/00 29/270

(Continued)

FOREIGN PATENT DOCUMENTS

SE EP 1097784 A1 * 5/2001 .............. B25B 27/14

OTHER PUBLICATIONS

Cage Nut Tool image from Google images cmsplc.com (one sheet).

(Continued)

*Primary Examiner* — Essama Omgba
(74) *Attorney, Agent, or Firm* — Krieg DeVault LLP

(57) ABSTRACT

An apparatus includes a shaft having a first end comprising a beveled surface. A second end of the shaft includes a gripping member. The apparatus additionally includes a channel formed on the beveled surface, wherein the channel comprises an opening, and wherein the opening traverses the beveled surface at a constant vertical position relative to an angle of the beveled surface.

20 Claims, 3 Drawing Sheets

(56) References Cited

U.S. PATENT DOCUMENTS

| | | | | | |
|---|---|---|---|---|---|
| D350,270 | S | * | 9/1994 | Jensen | D8/89 |
| 5,495,651 | A | * | 3/1996 | Tsuha | B25B 27/02 254/25 |
| 5,564,175 | A | * | 10/1996 | Nejad | B25B 27/0028 29/235 |
| 5,820,107 | A | * | 10/1998 | Hall | B25C 11/00 254/25 |
| 6,038,754 | A | * | 3/2000 | Stafford | B25B 31/00 254/25 |
| D428,569 | S | * | 7/2000 | Miles | D8/14 |
| D465,389 | S | * | 11/2002 | Norton | D8/14 |
| 6,663,082 | B1 | * | 12/2003 | Ploeger | B25C 11/00 254/129 |
| 6,807,699 | B2 | * | 10/2004 | Michelman | B25B 15/007 227/63 |
| 6,886,229 | B1 | * | 5/2005 | Wilson | B25B 27/04 29/267 |
| D511,287 | S | * | 11/2005 | Lake | D8/14 |
| 7,040,203 | B1 | * | 5/2006 | Chistiano | E05B 19/20 81/3.55 |
| 7,048,255 | B2 | * | 5/2006 | Buch | B25C 11/00 254/25 |
| 7,231,700 | B2 | * | 6/2007 | Hubbard | B25B 31/00 29/267 |
| D602,323 | S | * | 10/2009 | Alleyne | D8/14 |
| 8,342,482 | B2 | * | 1/2013 | Smith | B66F 15/00 254/131.5 |
| 8,713,773 | B2 | * | 5/2014 | Foxx | B25B 27/0028 29/270 |
| 2006/0242811 | A1 | * | 11/2006 | Hubbard | B25B 31/00 29/267 |
| 2012/0134763 | A1 | | 5/2012 | Lin et al. | |
| 2012/0266458 | A1 | * | 10/2012 | Foxx | B25B 27/0028 29/801 |
| 2014/0150609 | A1 | * | 6/2014 | Wu | B25B 27/0042 81/10 |

OTHER PUBLICATIONS

Cage Nut Tool image from Google images cablesplususa.com (one sheet).

* cited by examiner

CAGE NUT TOOL

RELATED APPLICATIONS

The present application claims the benefit of U.S. Provisional Patent Application 61/747,074, filed Dec. 28, 2012, and is incorporated herein by reference.

FIELD OF THE INVENTION

The present invention relates generally to hand tools, and more particularly, but not exclusively, to hand tools for the insertion and removal of cage nuts from hole racks.

BACKGROUND

Square hole racks are commonly used in industry, including for server storage, audio and visual equipment storage, electronic equipment storage, and other applications. Square hole racks often utilize cage nuts which engage the holes and provide support for shelves or equipment. The installation of cage nuts can be challenging, and can require through-hole engagement of an edge of the cage nut, a degree of force at an awkward angle to compress the spring steel of the cage nut, and disengagement from the cage nut after positioning the cage nut in the square hole rack. Excessive compression of the cage nut can deform or damage the cage nut. Release of a cage nut while compressed but before full engagement with the square hole rack can result in damage to equipment or the cage nut, injury to the operator, loss of the cage nut, and/or operator frustration. Many currently known devices and techniques to install cage nuts suffer from various drawbacks, particularly where installation time is limited, conditions where limited space is available within the square hole rack (e.g. devices are already installed immediately above or below the target installation position), and/or in high volume installations. Therefore, further technological developments are desirable in this area.

SUMMARY

One embodiment of the present invention is a unique cage nut insertion tool. Other embodiments include apparatuses, systems, devices, methods, and combinations for the insertion and removal of cage nuts. Further embodiments, forms, features, aspects, benefits, and advantages of the present application shall become apparent from the description and figures provided herewith.

DETAILED DESCRIPTION OF THE DRAWINGS

Figure 1:
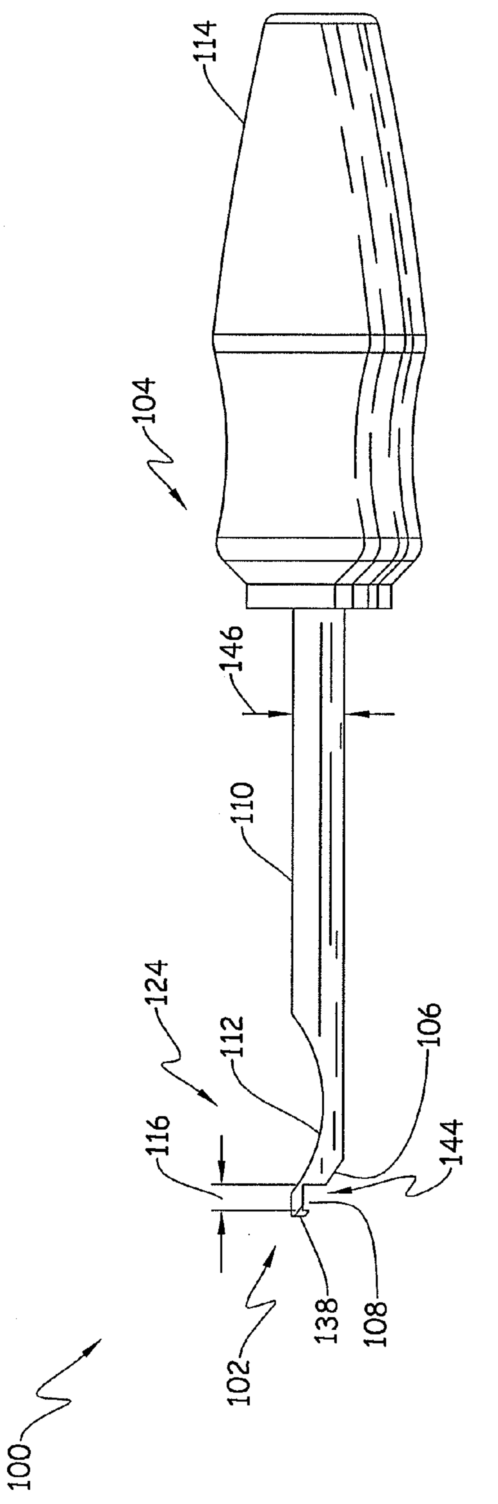
FIG. 1 is a schematic view of an embodiment of a cage nut tool.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referencing FIG. 1, an exemplary cage nut tool 100 includes a shaft 110 having a first end 102 and a second end 104. The first end 102 can include the literal end of the tool 100 and/or elements of the tool toward the first end 102. In certain aspects, any feature past a mid-point of the shaft 110 (not shown) can comprise the first end 102. The second end 104 likewise includes the literal end of the tool 100, and/or any feature past the mid-point of the shaft 110. The literal end of the shaft 110 in the tool 100 can be considered the position where the shaft 110 enters a gripping member 114, and/or an end of the shaft 110 positioned within the gripping member 114 (not shown).

The cage nut tool 100 includes a beveled surface 106 at the first end 102 of the shaft 110, and a gripping member (a handle 114 in the example of FIG. 1) at the second end 104 of the shaft 110. The gripping member 114 may be any type of gripping member, including without limitation a molded handle, a slide-on handle or device, an overmolded part, an attached handle, and/or any other device which may be grasp by a user to utilize case nut tool 100. The beveled surface 106 at the first end 102 may terminate at or near the first end 102, and the cage nut tool 100 may include a flat portion 138 above the beveled surface 106 at the first end 102.

For purposes of clear description, the shaft 110 can be understood to have a vertically lower portion 126 (reference FIG. 2) and a vertically upper portion 124. The vertically lower portion 126, where present, is the side proximate an outwardly projecting line normal to the beveled surface 106 (e.g. see line 122 in FIG. 2). Proximate includes, for example, the geometric extending 130 of the shaft 110 that is crossed by the line 122. In certain embodiments, the vertically lower portion 126 is the side of the shaft 110 where the beveled surface 106 begins, the side where the beveled surface is closest to the second end 104, and/or the side of the shaft 110 most open to a channel 108 on the beveled surface 106.

Figure 2:
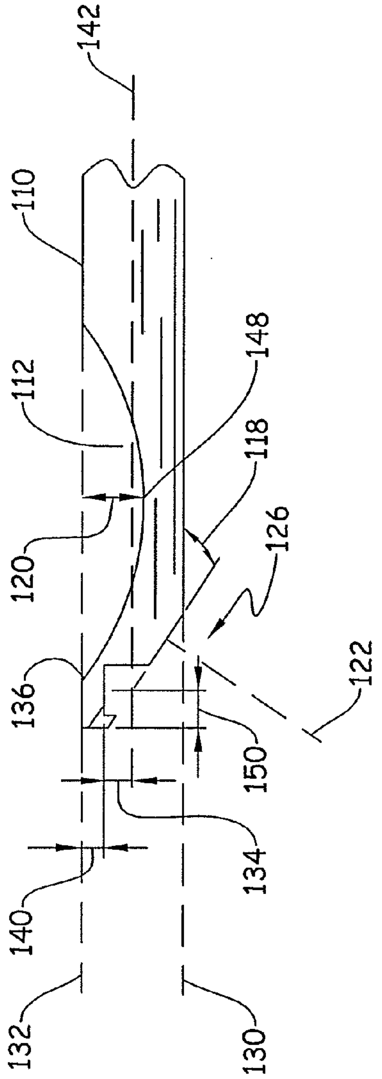
FIG. 2 is a cut away view of a portion of a cage nut tool.

Referencing FIG. 2, an exemplary beveled surface 106 extends from a lower geometrical boundary 130 of the shaft 110 toward the first end 102 of the shaft. The beveled surface 106 rises at an angle 118 relative to an axis 142 of the shaft 110. An example angle includes a 30-degree angle, although other rise angles are contemplated herein. In certain embodiments, without limitation, the angle 118 can be between 22.5 degrees and 45 degrees. The beveled surface 106 is depicted as a flat surface, which provides for ease of manufacture. However, the beveled surface 106 may be curved or include a curved portion, and can include upward or downward concavity, or combinations thereof.

The cage nut tool 100 includes a channel 108 formed on the beveled surface 106. The channel 108 includes an opening 144 (defined by the lower and upper edges of the channel 108 on the beveled surface 106) that can traverse the beveled surface 106 at a constant vertical position relative to the angle 118 of the beveled surface 106. The opening 144 is parallel to the horizontal axis 142 of the shaft 110. The channel 108 includes a depth 134 which progresses vertically. Due to the positioning of the channel 108 on the beveled surface 106, the depth 134 is greater at one end of the channel (axially toward the second end 104) than the other (axially toward the first end 102). The depth 134 may progress vertically or near vertically, where an angle that is near vertical is an angle providing a sufficient engagement lip between the first end 102 and the channel 108 to engage a lip or rim of a target cage nut. For example, referencing FIG. 3, a cage nut 308 includes a tab 306 that is engageable with the engagement lip formed by the channel and first end a cage nut tool 100. The vertical depth 134 of the channel 108 is such that there is a remaining amount of material 140 of the shaft 110 between the channel 108 and the vertically upper portion 124. In one embodiment, the remaining amount of material 140 is between 0.6 mm and 1.0 mm thick. The remaining amount of material 140 is described for purposes of describing the geometry of the tool 100. In certain embodiments, the channel 108 is formed by machining material away from an in-situ device having a shaft 110 and beveled surface 106, but alternatively or additionally, aspects of the tool 100 may be formed in place without later machining or processing.

A distance 150 between an axial center of the channel 108 and the first end 102 is depicted, and the distance 150 is selected such that the tab 306 is engageable through a square hole 304 of a square hole rack 302. The range of distances 150 that are acceptable depend upon the specific dimensions of a target cage nut 308 and square hole 304. An example distance 150 is a channel 108 positioned such that the distance 150 is less than or equal to 2 mm.

An example tool 100 includes a grooved portion 112 positioned on a vertically upper portion 124 of the shaft 110. An axially forward extent 136 of the grooved portion 112 is positioned far enough forward such that the grooved portion 112 is at least partially positioned over the beveled surface 106. The grooved portion 112 may be formed by material removed from a shaft 110, and/or be formed in place. The grooved portion 112 includes a vertical depth 120. The magnitude of the vertical depth 120 depends upon the geometry of the shaft 110, the geometry of the target square hole 304, and the geometry of the cage nut 308. The grooved portion 112, in certain embodiments, aids in positioning the engagement lip formed by the channel 108 and first end 102 above the tab 306 of the engagement nut. A smaller hole 304 and/or greater vertical extent of the tab 306 before compression indicate a greater vertical depth 120 of the grooved portion 112. The range of vertical depths 120 that are acceptable depend upon the specific dimensions of a target cage nut 308 and square hole 304, and are readily determined by one of skill in the art having the available dimensions in view and the benefit of the disclosures herein. An example vertical depth 120 is between 3 mm and 5 mm.

The grooved portion 112 may be of any shape, including at least a radius of curvature, a circular radius of curvature, and/or an elliptical radius of curvature. The grooved portion 112 includes a lowest position 148, which is at the greatest vertical depth 120. The lowest position 148 can be positioned at any axial distance from the first end 102 that allows for convenient engagement of the cage nut tab 306. Exemplary and non-limiting grooved portions 112 include a lowest position 148 that is axially between 9 mm and 12 mm from the first end 102, and/or a lowest position 148 that is axially between 8 mm and 10 mm from an axial center of the channel 108. In certain embodiments, the grooved portion 112 includes a radius of curvature that equates to a portion of a circle having a diameter between 10 mm and 12 mm.

The shaft 110 has a cross-sectional geometry extending along the horizontal axis 142. The cross-sectional geometry can be bounded by the lower geometrical boundary 130 at the vertically lower portion 126, and an upper geometrical boundary 132 at a vertically upper portion 124. The shaft 110 can have any cross-sectional geometry, including without limitation to a circle, ellipse, hexagon, square, or rectangle. The geometry of the shaft 110 can also vary along the axial length. In certain embodiments, one or more of the beveled surface 106, the channel 108, and the grooved portion 112 are included completely within the cross-sectional geometry of the shaft 110. One of skill in the art will recognize that features included completely within the cross-section geometry of the shaft 110 can be formed by providing a shaft 110 having a sufficient axial extent, and removing portions of the shaft 110 to form the desired feature. In certain embodiments, the tool 100 includes a shaft 110 including a regular circular cross-section to at least the first end 102, with portions removed to form the beveled surface 106, the channel 108, and/or the grooved portion 112. Additionally or alternatively, a tool 100 includes the shaft having a feature beyond the axial extent of the first end 102, where the feature is removed during operations to form the tool 100. Example and non-limiting features include a screwdriver tip, chisel tip, or other tool feature.

A gripping member 114 can be coupled to the second end 104 of the shaft 110. The gripping member 114 can be of any form to permit a user to grasp the gripping member 114. The gripping member 114 can include a coating on the shaft 110, a flattened portion extending from the second end, or any number of handle configurations, one such handle configuration being illustrated in FIG. 3. The gripping member 114 can include any number of ergonomic features to allow for user comfort.

Figure 3:
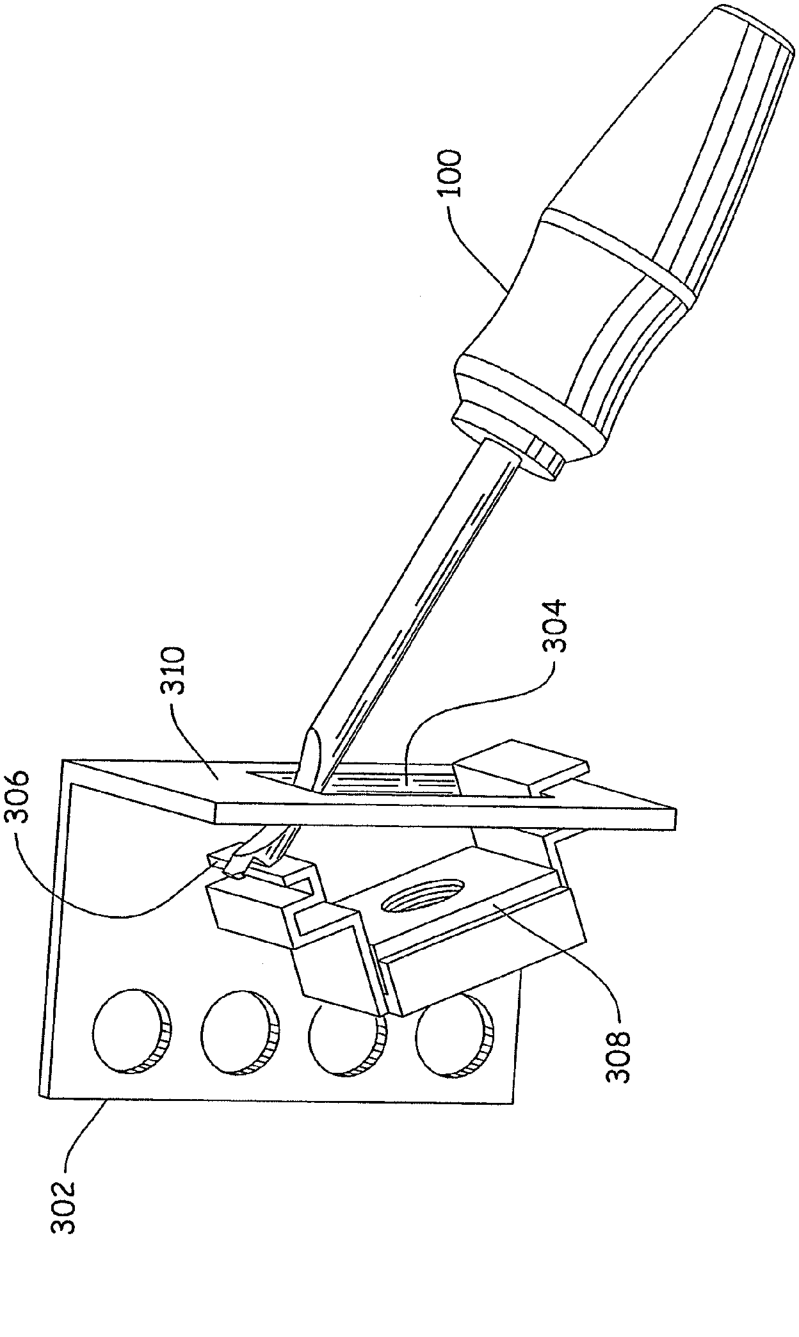
FIG. 3 is a schematic view of a cage nut tool inserting a cage nut into a square hole rack.

Referring to FIG. 3, a cage nut 308 is inserted into a cage nut receiving portion 304 of a rack 302. The rack 302 can be a square hole rack 302 as is common within telecommunication, computing, and audio, among other, industries. The rack 302 can be of various sizes and configurations depending upon the application for which the rack 302 is selected. The cage nut 308 includes a tab 306 which is compressed to engage a cage nut receiving portion 304 and retain the cage nut 308 therein. While the cage nut 308 is illustrated with two opposing cage nut tabs 306, it is contemplated that the cage nut 308 can include any number and configuration of cage nut tabs 306 sufficient to secure the cage nut 308 within the rack 302. The cage nut 308 can be utilized to retain server disc arrays, audio devices and/or players, disc players, routers, rails such that various devices may be slid out of the rack 302, and/or any other devices suitable to be engaged within the rack 302. In a specific embodiment, the rack 302 can be a server rack 302. A cage nut tool 100 can be utilized to compress the cage nut tab 306 so that the tab can engage an upper surface 310 of the cage nut receiving portion 304, and thereby retain the cage nut 308 within the cage nut receiving portion 304.

Figure 4B:
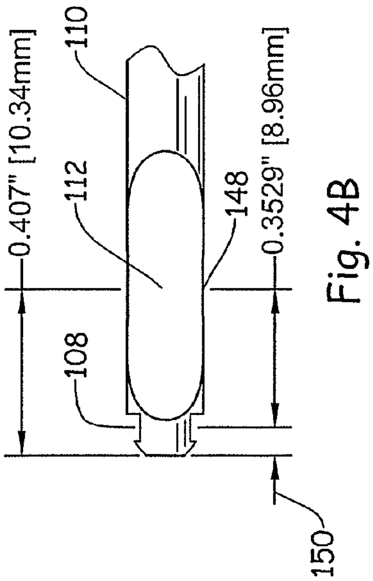
FIGS. 4A-4C is a schematic cut away view of an embodiment of a cage nut insertion tool including illustrative dimensions.
Figure 4A:
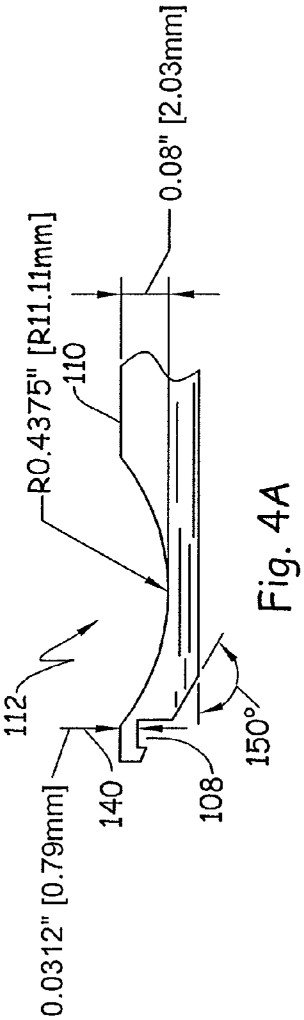
Figure 4C:
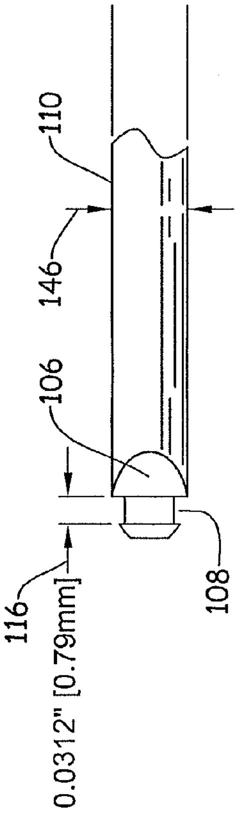

Referring to FIGS. 4A-4C, portions of a specific embodiment of a cage nut tool are depicted. The shaft 110 includes a circular cross-section having a diameter 146 of about 6 mm. The grooved portion 112 includes a circle having a radius of about 11 mm and a vertical depth 120 of about 4 mm. The beveled surface 106 extends about 150 degrees relative to the lower geometrical boundary 130, or an angle 118 of 30 degrees. The remainder portion 140 of material has a thickness of about 0.8 mm. The axial width 116 of the channel 108 is about 0.8 mm. A distance from the first end 102 to the lowest portion 148 of the grooved portion 112 is about 10 mm. A depth 120 of the grooved portion is about 2 mm. A distance from the axial center of the channel 108 to the lowest portion 148 of the grooved portion is about 9 mm.

An example procedure utilizing a cage nut tool is described following. The procedure includes an operation to insert a cage nut tool 100 into a cage nut receiving portion 304 of a square hole rack 302. The procedure includes an operation to engage a tab 306 of the cage nut 308 with a channel 108 formed on a beveled surface 106 of the first end 102, and an operation to compress the tab 306 of the cage nut 308. The procedure further includes an operation to withdraw the first end of the cage nut insertion tool, thereby engaging the cage nut 308 to the square hole rack 302. Certain further example operations of the procedure are described following. An example procedure includes an operation to extend the channel through the cage nut receiving portion of the square hole rack to a position vertically above the cage nut tab. A further example procedure includes an operation to engage a grooved portion of the cage nut insertion tool with an upper surface of the cage nut receiving portion of the square hole rack during the extending of the channel through the cage nut receiving portion of the square hole rack. Another example procedure includes lowering a handle portion of the cage nut insertion tool during the extending of the channel, and raising the handle portion during at least a portion of the withdrawing operation.

One embodiment of the present invention is an apparatus, comprising a shaft having a first end and a second end, the first end comprising a beveled surface and wherein the second end is coupled to a gripping member. The apparatus further comprises a channel formed on the beveled surface, wherein the channel comprises an opening, and wherein the opening traverses the beveled surface at a constant vertical position relative to an angle of the beveled surface.

In one form the shaft comprises a vertically lower portion comprising a side proximate to an outwardly projecting normal line from the beveled surface, and a vertically upper portion comprising a side opposing the vertically lower portion, the apparatus further comprising a grooved portion disposed on the vertically upper portion of the shaft, wherein the grooved portion at least partially extends over the beveled surface. In another form, the beveled surface, the channel, and the grooved portion are defined by a shaft cylinder geometry comprising a cylindrical shape having a cross-sectional shape corresponding to the shaft.

In yet another form, the shaft comprises a cross-sectional shape that is a 6 mm diameter circle. In still yet another form, the grooved portion comprises a curvature comprising at least one of a portion of a circle and a portion of an ellipse. In another form, the grooved portion comprises a portion of a circle having a radius between 10 and 12 mm.

In yet another form, the grooved portion comprises a vertical depth of between 3 and 5 mm. In still yet another form, the grooved portion comprises a circle having a radius of 11 mm and a vertical depth of 4 mm. In another form, the channel comprises a width perpendicular to the vertical that is between 0.6 and 1.0 mm. In still yet another form, the channel comprises a depth such that a remaining amount of material between the channel and the vertically upper portion of the shaft comprises a thickness between 0.6 and 1.0 mm. In yet another form, the beveled surface comprises a 30 degree bevel relative to an axis of the shaft.

Another embodiment is an article of manufacture, comprising a shaft having a beveled surface at a first end and a gripping member coupled to a second end, the shaft comprising a vertically lower portion comprising a side proximate to an outwardly projecting normal line from the beveled surface, and a vertically upper portion comprising a side opposing the vertically lower portion. The article of manufacture further comprises a channel formed on the beveled surface, wherein the channel comprises an opening, and wherein the opening traverses the beveled surface at a constant vertical position relative to an angle of the beveled surface, and wherein the channel comprises a depth that progresses vertically. The article of manufacture further comprises a grooved portion disposed on the vertically upper portion of the shaft, wherein the grooved portion extends at least partially over the beveled surface.

In one form, the grooved portion comprises a lowest position, wherein the lowest position is axially between 9 mm and 12 mm from the first end of the shaft, wherein axially is determined relative to an axis of the shaft. In another form, the lowest position is horizontally between 8 mm and 10 mm from an axial center of the channel. In yet another form, the grooved portion comprises a curvature comprising a portion of a circle having an 11 mm radius and a vertical depth comprising 4 mm. In still yet another form, the shaft comprises a geometrical cylinder having a vertical depth of 6 mm.

Another embodiment is a cage nut insertion tool, comprising a cylindrical shaft extending from a first end to a second end, wherein a handle is coupled to a second end of the shaft, and wherein the first end comprises a beveled surface having a rise of between 22.5 degrees and 45 degrees above a horizontal axis of the shaft, the tool comprising a vertical direction being defined by the rise direction of the beveled surface. The cage nut insertion tool further comprises a channel disposed on the beveled surface, the channel having an opening parallel to the horizontal axis of the shaft and having a depth which progresses vertically. The cage nut insertion tool further comprises a grooved portion on a vertically upper side of the shaft, the grooved portion partially extending over the beveled surface.

In one form, the cylindrical shaft comprises a circular cross-section having a diameter of 6 mm, wherein the channel comprises an axial width of 0.8 mm, and wherein the beveled surface includes a rise of 30 degrees above the horizontal axis of the shaft. In another form, the grooved portion further comprises a radius of curvature of 11 mm. In yet another form, the cage nut insertion tool further comprises a remainder portion between the vertically upper portion of the shaft and a deepest portion of the channel, wherein the remainder portion comprises 0.8 mm. In still yet another form, an axial center of the channel is positioned within 2 mm of the first end.

Another embodiment is a method, including inserting a first end of a cage nut insertion tool into a cage nut receiving portion of a square hole rack and engaging a cage nut tab of a cage nut with a channel formed on a beveled surface, the first end including the beveled surface. The method further includes compressing the cage nut and withdrawing the first end of the cage nut insertion tool, and thereby engaging the cage nut to the square hole rack.

In one form, the inserting further comprises extending the channel through the cage nut receiving portion of the square hole rack to a position vertically above the cage nut tab. In another form, the extending comprises engaging a grooved portion of the cage nut insertion tool with an upper surface of the cage nut receiving portion of a square hole rack. In still yet another form, the extending further comprises lowering a handle portion of the cage nut insertion tool, and wherein the withdrawing further comprises raising the handle portion of the cage nut insertion tool.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. In reading the claims it is intended that when words such as "a,"

"an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:

inserting a first end of a cage nut insertion tool into a cage nut receiving portion of a square hole rack, wherein the first end of the cage nut insertion tool comprises a shaft including a beveled surface and a channel formed on the beveled surface in a vertical direction relative to a first surface extending substantially perpendicular to an axis of the shaft, and wherein the channel comprises an opening traversing the beveled, surface at a constant vertical position relative to an angle of the beveled surface, the channel further including a floor offset from the opening in the vertical direction;

engaging a cage nut tab of a cage nut with the channel;

compressing the cage nut; and withdrawing the first end of the cage nut insertion tool.

2. The method of claim 1, wherein the engaging further includes receiving a portion of the cage nut tab in the channel, and wherein the channel further comprises a depth that progresses vertically.

3. The method of claim 1, wherein the withdrawing further comprises engaging the cage nut to the square hole rack such that the cage nut tab engages an edge of the cage nut receiving portion of the square hole rack.

4. The method of claim 1, wherein the inserting further comprises extending the channel through the cage nut receiving portion of the square hole rack to a position vertically above the cage nut tab.

5. The method of claim 4, wherein the extending comprises engaging a grooved portion of the cage nut insertion tool with an upper surface of the cage nut receiving portion of the square hole rack, wherein the grooved portion is located on a vertically upper portion of the shaft.

6. The method of claim 4, wherein the extending comprises pivoting a circumference of a grooved portion of the cage nut insertion tool around a surface of the cage nut receiving portion of the square hole rack, wherein the grooved portion is located on a vertically upper portion of the shaft, and wherein the grooved portion extends at least partially over the beveled surface.

7. The method of claim 4, wherein the extending further comprises lowering a handle portion of the cage nut in sertion tool, and wherein the withdrawing further comprises raising the handle portion of the cage nut insertion tool.

8. A cage nut tool, comprising:

a shaft having an axis, a first end comprising a beveled surface at an angle to the axis, and a second end including a gripping member; and a channel formed on the beveled surface, wherein the channel comprises an opening that extends parallel to the axis, the channel defined by a first surface extending substantially perpendicular to the axis from the beveled surface, a second surface extending substantially perpendicular to the axis at a distance from the first surface along the axis, and a third surface extending therebetween, the third surface substantially parallel to the axis.

9. The cage nut tool of claim 8, wherein the shaft comprises a vertically lower portion comprising a side proximate to an outwardly projecting normal line from the beveled surface, and a vertically upper portion comprising a side opposing the vertically lower portion, the apparatus further comprising a grooved portion disposed on the vertically upper portion of the shaft, wherein the grooved portion at least partially extends over the beveled surface.

10. The cage nut tool of claim 9, wherein the beveled surface, the channel, and the grooved portion are defined within a shaft cylinder geometry comprising a cylindrical shape having a cross-sectional shape corresponding to the shaft.

11. The cage nut tool of claim 10, wherein the shaft comprises a cross-sectional shape that is approximately a 6 mm diameter circle.

12. The cage nut tool of claim 9, wherein the grooved portion comprises a curvature comprising at least one of a portion of a circle and a portion of an ellipse.

13. The cage nut tool of claim 12, wherein the grooved portion comprises a portion of a circle having a radius between 10 and 12 mm.

14. The cage nut tool of claim 13, wherein the grooved portion comprises a vertical depth of between 3 and 5 mm.

15. The cage nut tool of claim 9, wherein the channel comprises a width perpendicular to the vertical that is between 0.6 and 1.0 mm.

16. The cage nut tool of claim 15, wherein the channel comprises a depth such that a remaining amount of material between the channel and the vertically upper portion of the shaft comprises a thickness between 0.6 and 1.0 mm.

17. A cage nut insertion tool, comprising:

a cylindrical shaft extending from a first end to a second end, wherein a handle is coupled to the second end of the shaft, and wherein the first end comprises a beveled surface having a rise of between 22.5 degrees and 45 degrees above a horizontal axis of the shaft, the tool comprising a vertical direction being defined by the rise direction of the beveled, surface;

a channel disposed on he beveled surface, the channel having an opening and a bottom both substantially parallel to the horizontal axis of the shaft and having a depth which progresses vertically from the opening to the bottom; and a grooved portion on a vertically upper side of the shaft.

18. The cage nut insertion tool of claim 17, wherein the cylindrical shaft comprises a circular cross-section having a diameter of 6 mm, wherein the channel comprises an axial width of 0.8 mm, and wherein the beveled surface includes a rise of 30 degrees above the horizontal axis of the shaft.

19. The cage nut insertion tool of claim 17, wherein the grooved portion partially extends over the beveled surface.

20. The cage nut insertion tool of claim 17, further comprising a remainder portion between the vertically upper portion of the shaft and a deepest portion of the channel.

* * * * *